(12) United States Patent
Juels et al.

(10) Patent No.: US 9,230,114 B1
(45) Date of Patent: *Jan. 5, 2016

(54) REMOTE VERIFICATION OF FILE PROTECTIONS FOR CLOUD DATA STORAGE

(71) Applicant: EMC Corporation, Hopkinton, MA (US)

(72) Inventors: Ari Juels, Brookline, MA (US); Alina M. Oprea, Arlington, MA (US); Marten Erik van Dijk, Somerville, MA (US); Emil P. Stefanov, Berkeley, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/308,949

(22) Filed: Jun. 19, 2014

Related U.S. Application Data

(60) Division of application No. 13/339,768, filed on Dec. 29, 2011, now Pat. No. 8,799,334, which is a continuation-in-part of application No. 13/075,848, filed on Mar. 30, 2011, now Pat. No. 8,346,742.

(51) Int. Cl.
*G06F 17/30* (2006.01)
*G06F 21/57* (2013.01)

(52) U.S. Cl.
CPC ........ *G06F 21/577* (2013.01); *G06F 2211/007* (2013.01); *G06F 2221/2107* (2013.01)

(58) Field of Classification Search
None
See application file for complete search history.

(56) References Cited

PUBLICATIONS

Wang et al., "Toward Publicly Auditable Secure Cloud Data Storage Services", Aug. 2010, IEEE Network, pp. 19-24.*
Marten Van Dijk, "Hourglass Schemes: How to Prove that Cloud Files are Encrypted," iCORE Information Security (ICIS) Lab, Oct. 2011, pp. 1-32.
G. Ateniese et al., "Provable Data Possession at Untrusted Stores," ACM CCS, 2007, pp. 598-610.
G. Ateniese et al., "Scalable and Efficient Provable Data Possession," Proceedings of the 4th International Conference on Security and Privacy in Communication Networks, Apr. 2008, 11 pages.
M. Bellare et al., "Forward-Security in Private-Key Cryptography," Topics in Cryptology—CT-RSA, Nov. 2000, 24 pages.
J. Black et al., "UMAC: Fast and Secure Message Authentication," CRYPTO '99, Advances in Cryptology, Aug. 1999, 18 pages.
M. Blum et al., "Checking the Correctness of Memories," Algorithmica, Oct. 1992, 21 pages, vol. 12, Nos. 2-3.
K.D. Bowers et al., "Proofs of Retrievability: Theory and Implementation," IACR ePrint Report, 2008, pp. 1-24.
C. Cachin et al., "Asynchronous Verifiable Secret Sharing and Proactive Cryptosystems," Proceedings of the 9th ACM Conference on Computer and Communications Security, Aug. 2002, 25 pages, Washington DC, USA.

(Continued)

*Primary Examiner* — Hung Q Pham
(74) *Attorney, Agent, or Firm* — Ryan, Mason & Lewis, LLP

(57) ABSTRACT

A client device or other processing device comprises a file processing module, with the file processing module being operative to provide a file to a file system for encoding, to receive from the file system a proof of correct encoding of the file, and to verify the proof of correct encoding. The file system may comprise one or more servers associated with a cloud storage provider. Advantageously, one or more illustrative embodiments allow a client device to verify that its files are stored by a cloud storage provider in encrypted form or with other appropriate protections.

20 Claims, 6 Drawing Sheets

(56) References Cited

PUBLICATIONS

C. Cachin et al., "Asynchronous Verifiable Information Dispersal," 24th IEEE Symposium on Reliable Distributed Systems, Nov. 2004, 20 pages.

J.L. Carter et al., "Universal Classes of Hash Functions," Extended Abstract, Proceedings of the 9th Annual ACM Symposium on Theory of Computing, May 1977, pp. 106-112.

M. Castro et al., "Proactive Recovery in a Byzantine-Fault-Tolerant System," 4th Symposium on Operating System Design and Implementation, Oct. 2000, 15 pages.

R. Curtmola et al., "Robust Remote Data Checking," 4th ACM International Workshop on Storage Security and Survivability, Oct. 2008, 6 pages.

R. Curtmola et al., "MR-PDP: Multiple-Replica Provable Data Possession," International Conference on Distributed Computing Systems, Jun. 2008, 10 pages.

M. Etzel et al., "Square Hash: Fast Message Authentication via Optimized Universal Hash Functions," CRYPTO '99, Advances in Cryptology, Aug. 1999, 21 pages.

D.L.G. Filho et al., "Demonstrating Data Possession and Uncheatable Data Transfer," IACR, Report 2006/150, http://eprint.iacr.org/2006/150, 2006, 9 pages.

J.A. Garay et al., "Secure Distributed Storage and Retrieval," Theoretical Computer Science 243, Jul. 2000, pp. 363-389.

G.R. Goodson et al., "Efficient Byzantine-Tolerant Erasure-Coded Storage," 34th International Conference on Dependable Systems and Networks, Jun.-Jul. 2004, pp. 135-144.

S. Halevi et al., "MMH: Software Message Authentication in the Gbit/second Rates," Fast Software Encryption: 4th International Workshop, FSE '97, Mar. 1997, pp. 1-15, Haifa, Israel.

J. Hendricks et al., "Verifying Distributed Erasure-Coded Data," 26th ACM Symposium on Principles of Distributed Computing, Aug. 2007, 8 pages.

A. Herzberg et al., "Proactive Public Key and Signature Systems," Proceedings of the 4th ACM Conference on Computer and Communications Security, Dec. 1996, 15 pages.

A. Herzberg et al., "Proactive Secret Sharing or: How to Cope with Perpetual Leakage," CRYPTO, Springer-Verlag, Nov. 1995, 22 pages.

A. Juels et al., "PORs: Proofs of Retrievability for Large Files," ACM CCS, 2007, 22 pages.

H. Krawczyk, "LFSR-based Hashing and Authentication," CRYPTO, Springer-Verlag, Aug. 1998, pp. 129-139.

M. Lillibridge et al., "A Cooperative Internet Backup Scheme," Proceedings of the General Track: 2003 USENIX Annual Technical Conference, Jun. 9-14, 2003, pp. 29-41, San Antonio, Texas, USA.

W. Litwin et al., "Algebraic Signatures for Scalable Distributed Data Structures," 20th International Conference on Data Engineering, Mar.-Apr. 2004, 12 pages.

M. Naor et al., "The Complexity of Online Memory Checking," 46th Annual Symposium on Foundations of Computer Science, Oct. 2005, pp. 1-38.

W. Nevelsteen et al., "Software Performance of Universal Hash Functions," Advances in Cryptology, Eurocrypt, Springer-Verlag, May 1999, pp. 1-17.

J.S. Plank et al., "A Performance Evaluation and Examination of Open-Source Erasure Coding Libraries for Storage," 7th USENIX Conference on File and Storage Technologies (FAST), 2009, pp. 253-265.

M.O. Rabin et al., "Efficient Dispersal of Information for Security, Load Balancing, and Fault Tolerance," Journal of the Association for Computing Machinery, Apr. 1989, pp. 335-348, vol. 36, No. 2.

P. Rogaway, "Bucket Hashing and its Application to Fast Message Authentication," Journal of Cryptology, Oct. 1997, pp. 1-24.

T. Schwarz et al., "Store, Forget, and Check: Using Algebraic Signatures to Check Remotely Administered Storage," IEEE International Conference on Distributed Computing Systems (ICDCS), 2006, 10 pages.

H. Shacham et al., "Compact Proofs of Retrievability," Proceedings of Asiacrypt, Report 2008/073, Dec. 2008, pp. 1-36.

M.A. Shah et al., "Auditing to Keep Online Storage Services Honest," Proceedings of the 11th USENIX Workshop on Hot Topics in Operating Systems, May 2007, 6 pages, No. 11, San Diego, CA, USA.

V. Shoup, "On Fast and Provably Secure Message Authentication Based on Universal Hashing," CRYPTO 1996, Dec. 1996, pp. 313-328, vol. 1109.

M.W. Storer et al., "POTSHARDS: Secure Long-Term Storage Without Encryption," USENIX Annual Technical Conference, Jun. 2007, pp. 143-156.

K.D. Bowers et al., "HAIL: A High-Availability and Integrity Layer for Cloud Storage," ACM Conference on Computer and Communications Security, Nov. 2009, pp. 187-198.

H. Krawczyk et al., "HMAC-Based Extract- and-Expand Key Derivation Function (HKDF)," IETF RFC 5869, May 2010, pp. 1-15.

M. Burdon et al., "Encryption Safe Harbours and Data Breach Notification Laws," Computer Law & Security Review, 2010, pp. 520-534, vol. 26, No. 5.

R.L. Rivest, "All-or-Nothing Encryption and the Package Transform," in Fast Software Encryption, Lecture Notes in Computer Science, Jan. 1997, pp. 210-218, vol. 1267.

M. Burdon et al., "Encryption Safe Harbours and Data Breach Notification Laws," Computer Law & Security Review, 2010, 32 pages.

R. Krawczyk et al., "HMAC-Based Extract- and-Expand Key Derivation Function (HKDF)," Internet Engineering Task Forct (IETF), Request for Comments: 5869, May 2010, 15 pages.

U.S. Appl. No. 12/495,189, filed in the name of K.D. Bowers et al. on Jun. 30, 2009 and entitled "Distributed Storage System with Enhanced Security."

U.S. Appl. No. 12/827,097, filed in the name of A. Juels et al. on Jun. 30, 2010 and entitled "Distributed Storage System with Efficient Handling of File Updates."

U.S. Appl. No. 13/075,848, filed in the name of A. Juels et al. on Mar. 30, 2011 and entitled "Remote Verification of File Protections for Cloud Data Storage."

\* cited by examiner

ALGORITHM 1 BUTTERFLY HOURGLASS CONSTRUCTION
1: for $k$ from 0 to $n/2^j-1$ do
2:    for $i$ from 1 to $2^{j-1}$ do
3:      $(G_j[i + k], G_j[i + k + 2^{j-1}]) \leftarrow w(G_{j-1}[i + k], G_{j-1}[i + k + 2^{j-1}]);$
4:    end for
5: end for

| ALGORITHM 1 BUTTERFLY HOURGLASS CONSTRUCTION |
|---|
| 1: for $k$ from 0 to $n/2^j - 1$ do |
| 2:   for $i$ from 1 to $2^{j-1}$ do |
| 3:     $(G_j[i + k \cdot 2^j], G_j[i + k \cdot 2^j + 2^{j-1}]) \leftarrow w(G_{j-1}[i + k \cdot 2^j], G_{j-1}[i + k \cdot 2^j + 2^{j-1}]);$ |
| 4:   end for |
| 5: end for |

REMOTE VERIFICATION OF FILE PROTECTIONS FOR CLOUD DATA STORAGE

RELATED APPLICATION

The present application is a divisional of U.S. patent application Ser. No. 13/339,768, filed Dec. 29, 2011 and entitled "Remote Verification of File Protections for Cloud Data Storage," which is a continuation-in-part of U.S. patent application Ser. No. 13/075,848, filed Mar. 30, 2011 and entitled "Remote Verification of File Protections for Cloud Data Storage," the disclosures of which are incorporated by reference herein.

FIELD

The field relates generally to data storage, and more particularly to cryptographic techniques for verifying that a given stored file is actually stored with appropriate protections such as encryption.

BACKGROUND

Cloud data storage is swiftly supplanting many forms of local storage for consumers and enterprises alike. Cloud storage providers have an interest in demonstrating that files in their custody enjoy strong confidentiality and other protections, both to differentiate their services and to ease regulatory compliance for their clients.

For example, security breach notification laws in the United States, such as those in the recently-enacted HITECH (Health Information Technology for Economic and Clinical Health) Act, typically include a safe harbor exemption for encrypted data. To benefit from such provisions, cloud storage providers must demonstrate at a minimum that while in storage, files are in encrypted form. See M. Burdon et al., "Encryption safe harbours and data breach notification laws," Computer Law & Security Review, 26(5):520-534, 2010.

Auditors today commonly rely on periodic facility inspections and system architecture and configuration reviews to verify compliance with data-handling requirements under established standards such as Statement on Auditing Standards (SAS) No. 70. Such approaches are expensive and error prone. They do not support continuous monitoring or extensive fine-grained inspection and often presume correct reduction of security policies to practice. Automated verification of stored file formats is thus a compelling alternative or supplement to traditional audit approaches. To maximize cost effectiveness and minimize trust assumptions in an audited cloud storage provider, such verification should be executable remotely, e.g., by an auditor over the Internet.

Verifying that a file is encrypted would be much easier for an auditor or client that had sole possession of the encryption keys. In order for a cloud storage provider to compute over stored, encrypted data and furnish plaintext on demand, however, the provider itself must encrypt the file and manage the keys. This is the most common cloud storage model and the one that burdens clients the least. Furthermore, for a cloud storage provider to assume responsibility for file confidentiality and minimize security requirements for clients, it should never divulge encryption keys to external entities, the file owner included.

An auditor or client should therefore be able to verify that stored files are encrypted by a cloud storage provider that is itself managing the keys and performing the encryption and decryption operations on the files.

If the cloud storage provider holds encryption keys, then remotely verifying that stored files are encrypted presents a very difficult problem. Consider by way of example a client that entrusts a cloud storage provider with file F, asking that the cloud storage provider store it encrypted under some secret key κ as ciphertext G. How can the client verify that the cloud storage provider is actually storing G and not F? The client might challenge the cloud storage provider at a random time to send it the ciphertext G. But the cloud storage provider could deceive the client by just sending a random string R. If the cloud storage provider claims to be using an appropriate encryption algorithm, such as one that is indistinguishable under chosen ciphertext attack (IND-CCA), the client will be unable to distinguish between the random string R and the ciphertext G. It is also possible for the cloud storage provider to deceive the client by storing F in unencrypted form and then computing G on the fly, only in response to a verification request from the client.

Accordingly, a need exists for techniques for verifying that files stored by cloud storage providers are subject to appropriate protections such as encryption.

SUMMARY

Illustrative embodiments of the invention incorporate file protection verification functionality using an "hourglass" protocol that provides an efficient and accurate technique for verifying that files stored by cloud storage providers or other types of file systems are subject to appropriate protections such as encryption. The hourglass protocol is advantageously configured to ensure that transformation of a given file from one format to another is subject to minimum resource requirements.

In one embodiment, a client device or other processing device comprises a file processing module configured with file protection verification functionality. The file processing module is operative to provide a file to a file system for encoding, to receive from the file system a proof of correct encoding of the file, and to verify the proof of correct encoding.

As one example, the encoding may comprise encryption encoding and the proof of correct encoding may comprise a permutation key utilized in a keyed pseudo-random permutation that is applied to the file. In such an arrangement, the proof of correct encoding may further comprise an encoded file generated by encryption under at least first and second encryption keys, with a first one of the encryption keys being based on information supplied by the provider of the file and the second one of the encryption keys being on secret information associated with the file system.

As another example, the encoding may comprise leak-incriminating encoding and the proof of correct encoding may be generated utilizing hashes on digital signatures associated with respective blocks of the file. In such an arrangement, the proof of correct encoding may comprise an encoded file generated by applying an all-or-nothing transform function to the respective blocks of the file and their associated digital signatures.

One or more of the illustrative embodiments described herein advantageously overcome the above-noted difficulties associated with verifying that cloud storage providers are storing files in encrypted form. For example, using an hourglass protocol in a given one of these embodiments, a cloud storage provider cannot deceive a client by simply sending the client a random string, or by storing a file in unencrypted form and then encrypting it only upon receipt of a verification request from the client. Other embodiments can be implemented without the use of an hourglass function.

These and other features and advantages of the present invention will become more readily apparent from the accompanying drawings and the following detailed description.

DETAILED DESCRIPTION

Illustrative embodiments of the present invention will be described herein with reference to exemplary data storage systems and associated client devices, servers and other processing devices. It is to be appreciated, however, that the invention is not restricted to use with the particular illustrative system and device configurations shown. By way of example, embodiments of the invention may be implemented in a distributed storage system of the type described in U.S. patent application Ser. No. 12/495,189, filed Jun. 30, 2009 and entitled "Distributed Storage System with Enhanced Security," or U.S. patent application Ser. No. 12/827,097, filed Jun. 30, 2010 and entitled "Distributed Storage System with Efficient Handling of File Updates," which are commonly assigned herewith and the disclosures of which are hereby incorporated by reference herein.

Figure 1:
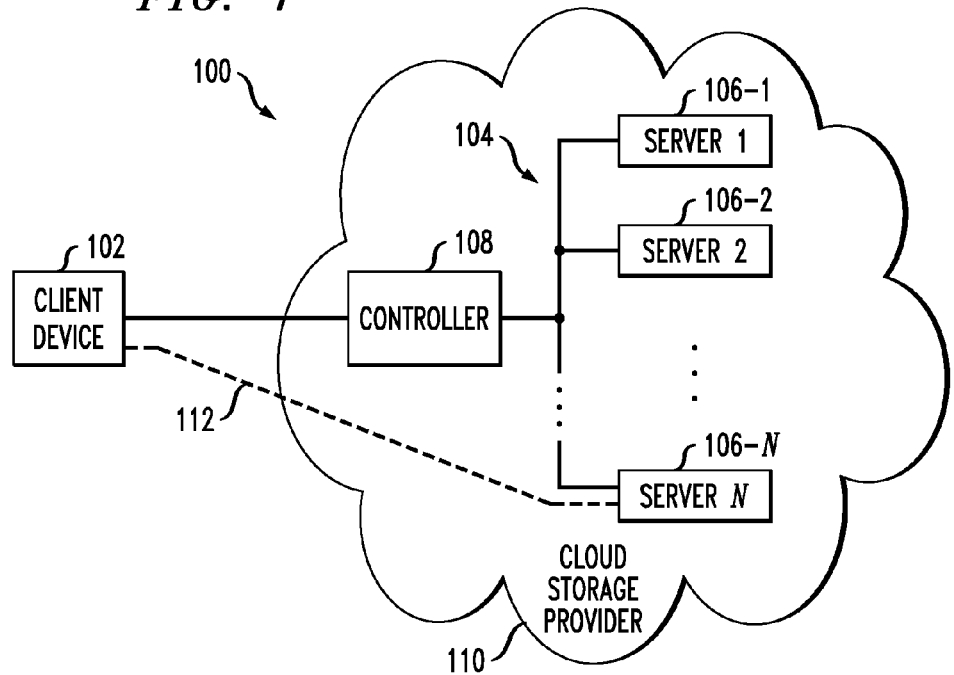
FIG. 1 is a block diagram showing one example of a data storage system in an illustrative embodiment of the invention.

FIG. 1 shows a data storage system 100 which includes a client device 102, a network 104, servers 106-1, 106-2, . . . 106-N, and a controller 108. The controller 108 may be configured to direct at least a portion of the processing operations of the servers 106, such as file storage, file retrieval and file verification operations. The servers 106 and controller 108 in this embodiment are associated with a cloud storage provider 110, and collectively provide a cloud storage environment for remote storage of files by client device 102. The client device 102 is coupled to the servers 106 via the controller 108, but may additionally or alternatively interact directly with one or more of the servers 106, as indicated, for example, by the communication path shown by dashed line 112. A given file F associated with client device 102 may be stored on a particular one of the servers 106, or may be stored across multiple servers 106 using the distributed storage techniques described in the above-cited U.S. patent application Ser. No. 12/495,189 and Ser. No. 12/827,097.

As will be described in detail below, the file F is processed in system 100 in such a way that the client device 102 can obtain reliable verification from the cloud storage provider 110 that the file is in fact stored in an encrypted format. Such verification may come, for example, in the form of cryptographically-verifiable proof provided by one or more of the servers 106 or the controller 108.

The client device 102 may be, for example, a desktop, laptop or palmtop personal computer, a mobile telephone, a personal digital assistant (PDA), a wireless email device, a workstation, a kiosk, a television set-top box, a game console, or more generally any type of information processing device from which a user or other verifier may wish to verify that a given file F stored in one or more of the servers 106 is actually stored in an encrypted format. The client device may also be referred to herein as simply a "client." The latter term is intended to be construed generally, so as to encompass the client device, a user of that device, or a combination of both of these entities.

A particular server 106 may be implemented as a computer or other stand-alone processing platform, or may be distributed over multiple processing platforms comprising multiple separate computers. The servers may be part of a single storage service or various subsets thereof may each be associated with independent storage services. Numerous other arrangements of multiple servers are possible in the storage system 100. The client device 102 and the servers 106 are examples of what are more generally referred to herein as "processing devices."

The client device 102 will generally include a user interface through which an associated user can interact with the system. This interaction allows the user to store files using one or more of the servers 106, to verify that any such stored files are actually stored in an encrypted format or with other appropriate file protections provided by the cloud storage provider 110, and to retrieve any such stored files.

As indicated above, the client device 102 may interact directly with one or more of the servers 106. Alternatively, at least a portion of the interaction between the client device and the servers may be carried out via an associated intermediary, illustratively shown in this embodiment as controller 108. Other types of intermediary processing devices may be arranged between the client device and the servers in other embodiments, such as switches, routers or other network equipment.

The network 104 may comprise, for example, a wide area network (WAN) such as the Internet, a local area network (LAN), a satellite network, a telephone or cable network, or various portions or combinations of these and other types of networks.

The network 104 over which servers 106 and controller 108 communicate with one another and with client device 102 is an example of a type of arrangement commonly referred to as a "cloud." File storage involving one or more of the N servers is representative of a cloud storage environment, and such an environment may also comprise other associated devices such as switches, routers and other network equipment. The servers 106 and controller 108 may be viewed as one example of what is more generally referred to herein as a "file system." That term is intended to be broadly construed so as to encompass a wide range of cloud storage environments including distributed storage environments based on virtual machines or other types of virtual infrastructure. Thus, a file system may comprise a single server or other processing device, or various combinations of such devices.

In an exemplary set of processing operations of the system 100, the client device 102 directs that a file in a first format be stored in the file system in a second format different than the first format. As mentioned previously, the first format may be an unencrypted format and the second format may be an encrypted format. The client device subsequently requests proof from the file system that the file is stored by the file system in the second format. The client device receives the proof from the file system responsive to the request, and verifies that the file is stored in the second format based on that proof. For example, the client device may determine if the proof was generated by the file system within a designated amount of time from the corresponding request. If it was so generated, the proof will be accepted, and if it was not, the proof will be rejected. The designated amount of time may be an amount of time less than that which would be required to convert the file from the unencrypted format to the encrypted format responsive to the request.

It is to be appreciated that a given embodiment of the system 100 may include multiple instances of client device 102, network 104, server set 106, and controller 108, although only single instances of such components are shown in the simplified system diagram for clarity of illustration. For example, a given user may have multiple personal computing devices that access different sets of servers over different networks. The particular number of servers in a given such set of servers is arbitrary and may vary depending upon the application, and thus the server sets may all have different numbers of servers.

Figure 2:
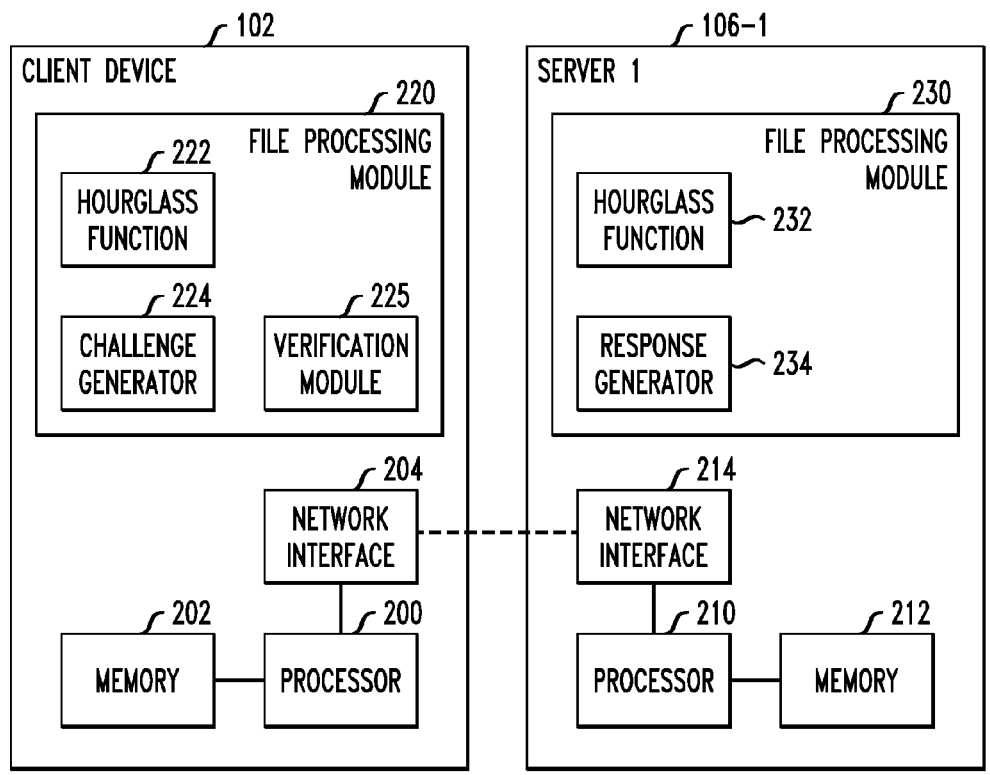
FIG. 2 is a more detailed view of a client device and a server of the FIG. 1 system.

Referring now to FIG. 2, a more detailed illustrative implementation of client device 102 and a given server 106-1 is shown. The other servers 106-2 through 106-N are each assumed to be configured in substantially the same manner as server 106-1.

The client device 102 in this embodiment comprises a processor 200 coupled to a memory 202 and a network interface 204. Similarly, the server 106-1 comprises a processor 210 coupled to a memory 212 and a network interface 214. The client device and server communicate with one another using their respective network interfaces. This communication in the FIG. 1 embodiment may be via controller 108, and additionally or alternatively may be direct communication or via one or more other intermediary devices. The network interfaces 204 and 214 may comprise conventional transceiver circuitry of a type well known to those skilled in the art. The processors 200 and 210 may comprise microprocessors, microcontrollers, application-specific integrated circuits (ASICs), field programmable gate arrays (FPGAs) or other types of processing circuitry, as well as portions or combinations of such circuitry elements.

The client device 102 and server 106-1 further comprise respective file processing modules 220 and 230. These modules collectively implement the file protection verification protocols shown in FIG. 3, and can also or alternatively implement other types of file protection verification protocols described herein. The module 220 of client device 102 is illustratively shown as comprising an hourglass function 222, a challenge generator 224, and a verification module 225. The module 230 of the server 106-1 is illustratively shown as comprising an hourglass function 232 and a response generator 234. Of course, these particular arrangements of modules are exemplary only, and other embodiments may use different arrangements of modules to provide the described functionality.

The file processing module 220 of the client device 102 may be implemented in whole or in part in the form of one or more software programs stored in memory 202 and executed by processor 200. Similarly, the file processing module 230 of the server 106-1 may be implemented at least in part in the form of one or more software programs stored in memory 212 and executed by processor 210. The memories 202 and 212 may each be viewed as an example of what is more generally referred to herein as a "computer program product" having executable computer program code embodied therein. Such memories may comprise electronic memories such as random access memory (RAM), read-only memory (ROM) or other types of memory, in any combination. The computer program code when executed in a processing device such as client device 102 or server 106 causes the device to perform corresponding operations associated with file storage, file retrieval and file protection verification. One skilled in the art would be readily able to implement such software given the teachings provided herein. Other examples of computer program products embodying aspects of the invention may include, for example, optical or magnetic disks.

In alternative embodiments, one or more of the modules associated with the client device 102 or the server 106 may be implemented at least in part within a separate entity such as the controller 108.

The storage system 100 in an illustrative embodiment implements a cryptographic protocol for file protection verification, examples of which are shown in FIG. 3. The protocol is also referred to herein as an "hourglass" protocol, in that it imposes a resource bound (e.g., time) on the process of translating a file from one encoding domain (e.g., plaintext) to a different one (e.g., ciphertext). The hourglass protocol is analogous in this respect to the operation of a conventional hourglass, in which movement of accumulated sand from an upper chamber of the hourglass to its lower chamber is constrained by the time required to pass through the narrow neck between the two chambers.

Advantageously, the hourglass protocol can be used by a cloud storage provider to demonstrate to a client that a given cloud-based file is stored in encrypted form under a cloud-managed key. It can also be used for verification of other file protections, such as storage of the file with an embedded "provenance tag" that pinpoints the origin of a file leak, or storage of a file inextricably with another file.

As mentioned previously, it is very difficult in conventional practice for a client to verify that a cloud storage provider is actually storing a given file in encrypted format. Consider once again the example of client that entrusts cloud storage provider with file F, asking that the cloud storage provider store it encrypted under a secret key κ as ciphertext G. It was noted above that the cloud storage provider can easily deceive the client by simply sending the client a random string R and claiming that R is the ciphertext G, or by storing F in unencrypted form and then computing G on the fly in response to a verification request from the client. The hourglass protocol of the present embodiment avoids this significant problem of the prior art by imposing a minimum time τ to translate a file from an unencrypted format to an encrypted format, based on a resource bound such as storage, computation or networking delays. The client can then challenge the cloud storage provider at a random time to produce H, and require that the provider do so in time less than τ. By successfully complying, the cloud storage provider proves that it has actually stored G, and not F, because it would take too long to translate F into G in response to the challenge from the client. Therefore, by responding to the client in a sufficiently timely way, the cloud storage provider proves to the client that it has stored the ciphertext G.

The hourglass protocol in an illustrative embodiment combines a properly parameterized resource bound with what is referred to herein as an hourglass function. As noted above, the resource bound is a time limitation imposed by one or more physical resources of the file system, such as storage, computation or networking delays. For example, hard drives experience delays due to seek time and bandwidth, and thus can serve as a resource bound. The hourglass function, implemented by modules 222 and 232 in the respective client device 102 and server 106-1 as shown in FIG. 2, is a cryptographically or coding-theoretically invertible function that imposes a lower bound on the number of resources required to translate between coding domains, so as to ensure a certain level of difficulty in the translation. A more detailed example of an hourglass function that may be utilized in modules 222 and 232 is a butterfly hourglass function, illustrative embodiments of which are shown in FIG. 4.

Figure 3A:
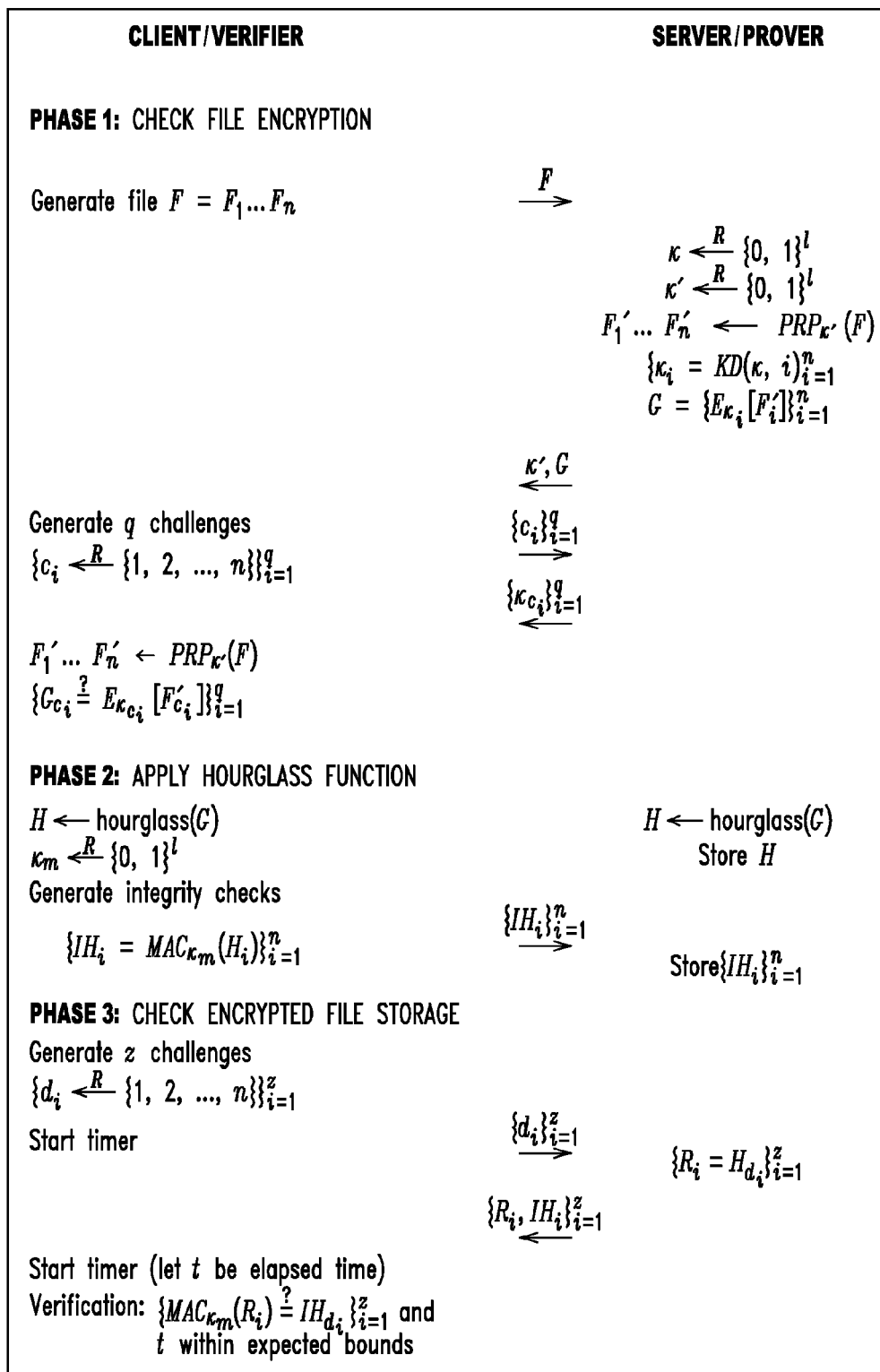
FIGS. 3A and 3B show examples of file protection verification protocols that may be implemented in the system of FIG. 1. These figures will be collectively referred to herein as FIG. 3.

In describing the exemplary FIG. 3A protocol, it will be assumed by way of example and without limitation that a given file F is to be stored in encrypted form on one of the servers 106-1 of the cloud storage provider 110 at the request of the client device 102. In this scenario, the client is the verifier and the server is the prover, as indicated at the top of FIG. 3A. The FIG. 3A protocol also assumes a model in which the cloud storage provider manages the encryption key, and never divulges it to the verifier. The diagram shows the operations performed by the client and server and the flow of information between these elements in carrying out the protocol. The prover in other embodiments may additionally or alternatively comprise another of the servers 106, the controller 108, or cloud storage provider 110.

It should be noted that the FIG. 3A protocol provides a number of additional refinements relative to the general description above. For example, in this particular protocol, the client 102 does not challenge the server 106-1 on G directly. Instead, the hourglass function is applied to G, yielding an encapsulated file H, before the server stores it. The client then challenges the server on a randomly-selected file block, rather than a full file. More particularly, the client challenges the server to produce a randomly-selected block $H_i$, as a proof that the server stored F in encrypted form. The hourglass function enforces a resource requirement, e.g., a time delay, on the translation from G to $H_i$. For example, every block $H_i$ may depend on many spread-out blocks of G. Therefore, if the server wishes to cheat, it must first encrypt many blocks of F to get G, and then use the resulting blocks of G to compute $H_i$. If each block retrieval carries a small time delay due, for example, to hard drive seek times, the hourglass function has the effect of amplifying this delay into a larger one. If the server stores H, the encapsulation of the ciphertext G, it can furnish $H_i$ with a single block fetch. Otherwise, it incurs the delay of many block fetches. A sufficiently quick response by the server thus proves storage of a ciphertext on F.

The protocol of FIG. 3A includes three phases, denoted Phase 1, Phase 2 and Phase 3. Phase 1 involves checking correct file encryption, Phase 2 involves applying the hourglass function, and Phase 3 involves checking encrypted file storage. Let n denote the number of file blocks in a given file F, and $F_i$ denote block i of F. The length in bits of a file block is given by l, such that $F_i \in B = GF[2^l]$. Suitable values of l are 128 or 256, although other values can be used.

In Phase 1 of the protocol, the client 102 sends the file F to the server 106-1. As noted above, these entities are also referred to as verifier and prover, respectively, in the context of the protocol. The server encodes F into ciphertext G using an encryption under a secret key unknown to the client. More specifically, the server processes F under a pseudo-random permutation (PRP) to generate a permuted file F'. It randomly generates a master key κ of length l, uses κ as input to a key derivation function KD to derive a set of n keys $\{\kappa_i\}_{i=1}^n$, and encrypts the $i^{th}$ block of the permuted file under $\kappa_i$. This encryption function for a given block $F_i'$ of the permuted file F' is denoted $E_{\kappa_i}[F_i']$, and may be implemented using AES or another known type of encryption. The server sends the ciphertext G and the additional key κ' to the client as indicated.

The key derivation function takes as input a master key κ of l bits and an index i and outputs a key $\kappa_i$ of l bits. The operation of the function may therefore be denoted as $\kappa_i \leftarrow KD(\kappa, i)$. The key derivation function may be, for example, the HKDF function described in IETF RFC 5869, "HMAC-based Extract-and-Expand Key Derivation Function (HKDF)," May 2010.

As indicated in the figure, the server randomly generates an additional key κ' for use with the PRP. The PRP takes as its input the additional key κ' and the n blocks of the file F and outputs the n blocks of the permuted file F'. The PRP may comprise, for example, a Halevi-Rogaway CMC tweakable enciphering mode denoted $CMC_{\kappa'}(F,T)$, with the tweak T being computed as $T \leftarrow h(id_F)$, where $h(\cdot)$ denotes a hash function and $id_F$ denotes a unique identifier of the file F. The unique identifier may comprise, for example, the full file name including the file system path.

To verify that the ciphertext G is correctly formatted, the client challenges the server to reveal q of the n keys selected at random, where q<n, and checks that the encryption is done correctly for these q randomly-selected keys. The PRP ensures that revealing a subset of the keys does not reveal the master key κ and therefore does not permit decryption of the file. Phase 1 of the protocol thus involves the server demonstrating to the client that G represents a correct encoding of file F.

In Phase 2 of the protocol, the encrypted file G is transformed by both the client 102 and the server 106-1 into an hourglass encapsulated file H, by application of an hourglass function hourglass ($\cdot$) to G. This hourglass encapsulation transforms the encrypted file into a format suitable for provably-encoded storage. In particular, H has a format that lets the server prove that the file is stored in its encrypted form. The server stores the hourglass encapsulated file H. The client uses H to generate and store integrity checks in the form of message authentication codes (MACs) over the blocks of H. More specifically, the client randomly generates a key $\kappa_m$ and then generates an integrity check $IH_i = MAC_{\kappa_m}(H_i)$ for each of the i blocks of H. The integrity checks are sent by the client to the server and stored by the server, as indicated in the figure.

As mentioned above, one possible hourglass function that may be utilized in Phase 2 of the protocol is referred to herein as a butterfly hourglass function. This function will now be described in greater detail with reference to FIG. 4. Let $w: B \times B \leftrightarrow B \times B$ denote a PRP over two file blocks, and thus an invertible operation. We model w as an atomic operation and define our construction in terms of a sequence of applications of w to pairs of blocks. As we are interested here in constructing a function hourglass computable by both server and client, we assume that the key for w is published. We define hourglass: $B^n \leftrightarrow B^n$ over encoded file G as follows. We assume that n is a power of two and define $G_0[i] = G[i]$ for all i. For $1 \le j \le \log_2(n)$, we compute the output of level j as a function of level j−1, as shown by the algorithm in FIG. 4A.

Figures 4A, 4B:
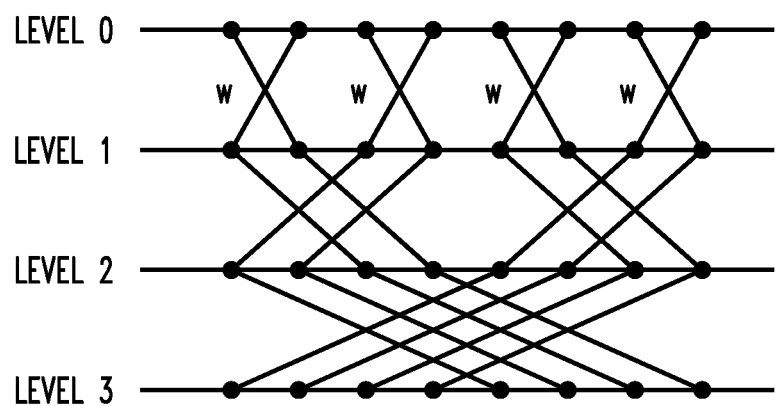
FIGS. 4A, 4B and 4C illustrate hourglass functions that may be utilized in the file protection verification protocols of FIG. 3. These figures will be collectively referred to herein as FIG. 4.

A butterfly construction of this type may be represented as a network or graph. FIG. 4B shows an example butterfly network for n=8. In this representation, each set of values $G_j[1], \ldots, G_j[n]$ is a row of nodes. Two edges connect the input and output node pairs involved in each application of w. Globally, hourglass involves n $\log_2$ n invocations of w. By way of example, in an embodiment in which file blocks are of size l=128 bits, w can be implemented as an AES encryption over 2l=256 bits with a known key. The function reverse–hourglass=hourglass$^{-1}$ may be computed by exploiting the invertibility of w.

Figures 4C, 5:
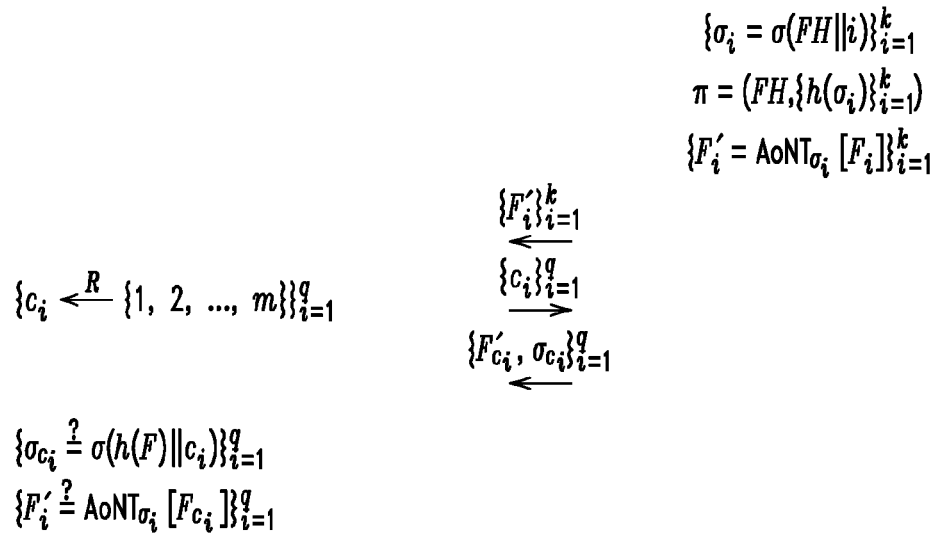
FIG. 5 shows an exemplary protocol for proving provenance tagging in an illustrative leak-incriminating encoding embodiment of the FIG. 1 system.

Although the indices utilized in Step 3 of the FIG. 4A algorithm do not extend to the full range of n, those skilled in the art will recognize that these indices may be adapted in a straightforward manner to extend to the full range of n. An example of one such extension of the FIG. 4A algorithm is shown in FIG. 4C. In this version of the algorithm, we define $G_0[i]=G[i]$ for $1 \le i \le n$, and we define $G_0[n+1], \ldots G_0[2^d]$ to be random blocks, where $d=\lceil \log_2 n \rceil$. For $1 \le j \le d$, we compute the output $G_j[1], \ldots G_j[n]$ of level j as a function of level j−1, as shown by the algorithm in FIG. 4C. This exemplary construction may be represented using substantially the same network or graph used to represent a construction of the type shown in FIG. 4A, and thus FIG. 4B may also be viewed as showing an example of a butterfly network for the FIG. 4C algorithm for the case of n=8.

In Phase 3 of the protocol, the client 102 checks that the server 106-1 has stored the encrypted file. The client randomly generates z block indices $d_i$ and sends them as challenges to the server as indicated. The client also starts a timer when it sends the challenges. The server sends back the blocks $R_i$ of the hourglass encapsulated file H corresponding to the indices $d_i$. The client stops the timer when the blocks $R_i$ are received. The elapsed time t of the timer indicates the amount of time between transmission of the challenges and receipt of the response from the server. The server can aggregate its responses before sending them to the client, or can send them individually. The elapsed time may therefore be measured, for example, between sending of the last challenge and receipt of the corresponding response, or in a variety of other ways.

The client then performs two checks. First, it verifies that the blocks $R_i$ are correct by determining if $MAC_{K_m}(R_i)$ is equal to $IH_{d_i}$ for each block. Second, the client verifies that the elapsed time t is within expected bounds. This phase therefore ensures that the server retrieves the blocks of H from storage, and does not compute them on the fly.

The time required by the server to reply to a given one of the challenges from the client in Phase 3 should be less than the time required to access a fraction of the plaintext file F and compute the hourglass transformation on the fly. For example, assume the server stores n file blocks, including a percentage p of plaintext blocks of F and the remainder a percentage 1−p of hourglass encapsulated blocks of H. For different values of p (e.g., 80% or 90%), one can determine experimentally how many blocks z the client needs to challenge so that with high probability (e.g., 99%) it can determine if the server is not storing the file in the correct format. The server can reply immediately to challenges for blocks of H that it stores. For the rest of the challenges, it has to compute the blocks $H_{d_i}$ on the fly and needs to access fraction p of the stored plaintext, which will result in a longer response time.

Although the above-described protocol allows the client to verify that the cloud storage provider has stored the file F in the appropriate encrypted format, it is also possible that the cloud storage provider might in addition store the file F in its unencrypted format, against the wishes of the client. However, there are operational and economic incentives for a provider only to meet its obligations to store encoded files. Among these is the simple desire to avoid unnecessary storage overhead.

It is to be appreciated that the particular operations of the FIG. 3A protocol are presented by way of illustrative example only, and other embodiments can use additional or alternative operations. For example, in both Phase 1 and Phase 3 of the FIG. 3A protocol, the client 102 can generate and send a single seed as a challenge to the server 106-1, instead of explicit block indices as previously described. The server can then derive the block indices $\{c_i \leftarrow KD(s_1,i)\}_{i=1}^q$ for Phase 1 and $\{d_i \leftarrow KD(s_3,i)\}_{i=1}^z$ for Phase 3, where $s_1$ and $s_3$ are the seeds for Phases 1 and 3, respectively, sent by the client to the server.

Also, different types of hourglass functions may be used. For example, one alternative hourglass function that may be used is based on a message-recoverable digital signature technique such as RSA PSS-R. In such an embodiment, the client generates a public/private signing key pair, uses the private key to sign encoded message blocks, and then discards the private key. The client then checks the correctness of the digital signature on a random block provided by the server in response to a challenge. Since the server cannot itself sign blocks, it can only pass verification by storing the original signatures, and thus the encoded file format G. It should be noted that this approach relies critically on the message-recoverability of the digital signature technique. With an ordinary signature technique in which messages are not inextricably bound to signatures, the server could cheat. It could retain the signatures on message blocks but throw away the encoded message blocks themselves. When challenged, it would simply rederive a required encoded message block on the fly and transmit it along with its signature.

Figure 3B:
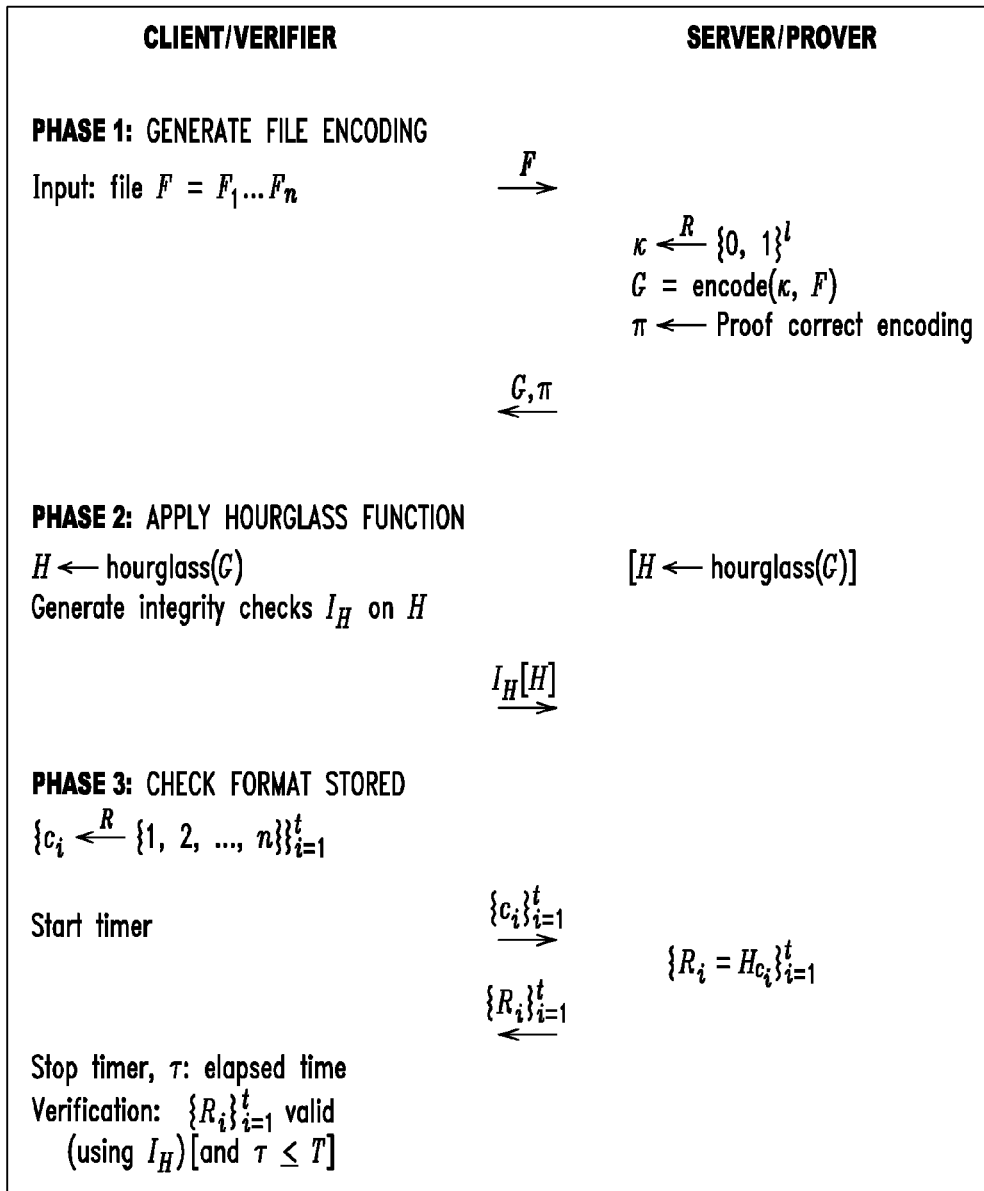

A more general version of the FIG. 3A protocol is shown in FIG. 3B. This version, like the FIG. 3A protocol, also includes phases denoted Phase 1, Phase 2 and Phase 3. In Phase 1, the server sends G to the client along with a proof π that G is a correct encoding. The client can then apply the hourglass transformation on G in Phase 2 to obtain H and compute any desired integrity checks.

Figure 7:
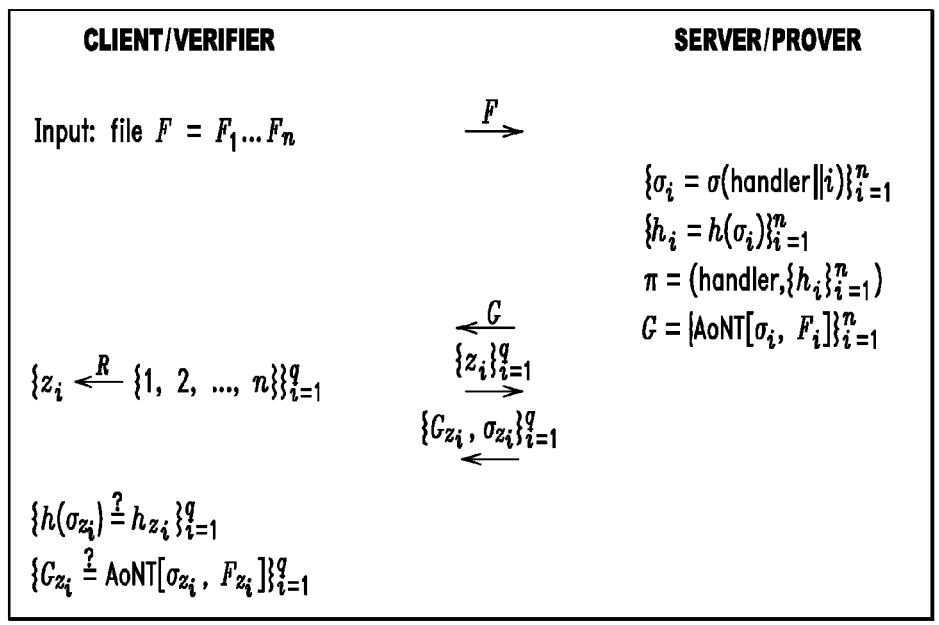

It should be noted that π is used in other contexts herein to refer to a provenance tag, such as in the protocols of FIGS. 5 and 7. Also, there are notational differences between the protocols of FIGS. 3A and 3B. For example, in the FIG. 3B protocol, elapsed time is denoted τ and the variable t denotes the number of challenges.

The FIG. 3B protocol proceeds as follows.

In Phase 1, the server applies an encode function to the original file F received from the client in order to obtain G. The encoding G, as well as the proof π of correct encoding, is sent to the client. At the end of Phase 1, the client is assured, with high probability, that the encode function has been applied correctly to F.

In Phase 2, the client applies an hourglass function to encoding G to compute the encapsulation H for storage on the server. The server may also perform the same operation, but need not do so. The application of the hourglass function in the present embodiment is a block-by-block transformation that produces n hourglass blocks $H_1, \ldots, H_n$. Note that if the hourglass function does not use a secret key, then both parties can compute H directly from G. This would save one round of n-block communications in exemplary butterfly and permutation constructions disclosed herein.

In Phase 3, the client challenges the server to verify that the server in fact stores H. In this challenge, the client chooses several random block indices $\{c_i\}_{i=1}^t$ and challenges the server to produce $\{H_{c_i}\}_{i=1}^t$. For verification, the client first checks the correctness of the responses. In addition, in this time-based embodiment, the client measures the time between its sending the challenge and receiving a reply. It accepts the response if it arrives in an amount of time that is less than some security parameter T. In some embodiments, the server may aggregate responses before sending them to the client.

For integrity checking, the client can use any of a variety of known approaches for data verification, such as, for example, MACs or Merkle trees. Once generated by the client, integrity checks can be stored by the client, or preferably stored on the server and retrieved in the challenge-response protocol. The client, of course, retains any cryptographic keys required for verification of these integrity checks.

As indicated above, other embodiments of the invention can utilize hourglass protocols to verify other types of file protections, such as storage of the file with an embedded provenance tag that pinpoints the origin of a file leak, or storage of a file inextricably with another file, both of which will now be described in greater detail.

The storage of a file with an embedded provenance tag is an example of an encoding format more generally referred to herein as leak-incriminating encoding (LIE). An exemplary protocol for verification that a given file F is stored with an embedded provenance tag $\pi$ is shown in FIG. 5. If F is leaked, $\pi$ identifies the cloud storage provider as the source of the leak, and thus the responsible entity. In this protocol, it is infeasible to learn F without learning $\pi$, i.e., learning the file implies learning the provenance tag. The server is configured to prove to the client that $\pi$ is embedded in F without revealing $\pi$ itself. This is important, as a client or auditor that learns $\pi$ could frame the storage provider, falsely furnishing $\pi$ as evidence that F has leaked.

In the FIG. 5 protocol, $AoNT_\kappa$ denotes an all-or-nothing transform which requires a query on value $\kappa$ in order to extract the underlying plaintext, and $\sigma(M)$ denotes a digital signature by the server on message M. The provenance tag $\pi$ is published by the server or digitally signed. A proof of leakage by an external entity consists of z correct signatures, i.e., z signatures corresponding to hashed signatures in $\pi$. The value z is a security parameter such that $q<z\leq k$. The q challenges are generated by the client in the same manner as in Phase 1 of the FIG. 3A protocol. For additional details on an all-or-nothing transform suitable for use in this embodiment, see R. L. Rivest, "All-or-nothing encryption and the package transform," in FSE 1997, pages 210-218.

The storage of a file inextricably with another file is also referred to herein as file binding. In such an embodiment, two files F and G are stored in such a way that retrieval of one file implies retrieval of the other. For example, F might be a piece of software and G an accompanying license agreement. Binding the two together ensures that any entity retrieving F also gets G and therefore cannot claim failure to receive critical legal information governing the use of the software. In one possible implementation, a given set of files may be bound together via application of the all-or-nothing transform AoNT. Subsequent application of an hourglass function and challenge-response verification are then performed in a manner similar to that previously described.

It should be appreciated that the particular protocols described in conjunction with FIGS. 3, 4 and 5 above are presented by way of illustrative example only, and alternative protocols may be used in other embodiments. Two additional examples of protocols for proving correct encoding in Phase 1 of the FIG. 3 protocols will now be described with reference to FIGS. 6 and 7, which involve encryption encoding and leak-incriminating encoding, respectively. In both of these examples, the server encodes file F into G using a secret unknown to the client. In the encryption encoding example, the secret is the key $\kappa$, while in the leak-incriminating encoding example, the secret comprises multiple digital signatures produced by the server that attest to the provenance of the file, where the signatures, if divulged, can be used to frame the server. Thus, proving that G is correctly encoded creates a difficulty, in that the server must prove to the client that G is correctly computed from F, without revealing the secret.

Figure 6:
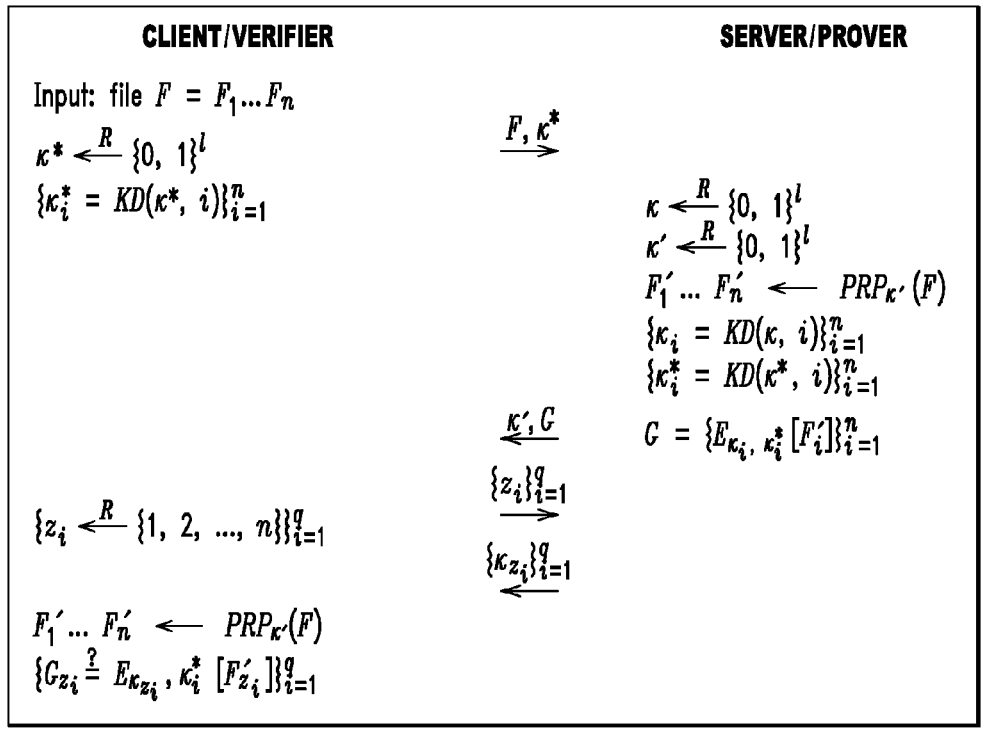
FIGS. 6 and 7 show additional examples of protocols for proving correct encoding in the exemplary file protection verification protocols of FIG. 3, for the cases of encryption encoding and leak-incriminating encoding, respectively.

It should be noted that the FIG. 6 and FIG. 7 protocols, and the FIG. 5 protocol, can be implemented independently of other portions of the FIG. 3 protocols, for example, without the use of Phase 2 or Phase 3, and thus without the use of an associated hourglass function or other encapsulation of an encoded file.

Referring initially to FIG. 6, the server encodes F under a PRP, and partitions the file into n blocks. It uses master key $\kappa$ to derive a set of keys $\{\kappa_i\}_{i=1}^n$, encrypting the $i^{th}$ block of the file under $\kappa_i$. Also, $KD(\kappa,i)$ denotes an indexed key-derivation function that takes master key $\kappa$ as input.

To verify that G is correctly formatted, the client challenges the server to reveal a subset of the keys for randomly chosen blocks. The PRP ensures that revealing a subset of the shares does not reveal $\kappa$ and therefore does not permit decryption of the full file. In the figure, $PRP_{\kappa'}$ denotes a keyed PRP using permutation key $\kappa'$, and $E_{\kappa_i,\kappa^*}$ denotes encryption under encryption keys $\kappa_i$ and $\kappa^*$. These two encryption keys $\kappa_i$ and $\kappa^*$ could be hashed together, for instance, to obtain the file block encryption key.

The number q of challenged blocks can be adjusted to obtain a desired confidence probability that file blocks are correctly encrypted. The client supplies some randomness, in this example in the form of encryption key $\kappa^*$, that is used in combination with the secret key generated by the server for generating file block encryption keys. The randomness provided by the client serves the goal of ensuring that file block encryption keys are generated with proper randomness.

With reference now to FIG. 7, a protocol is shown for proving correct encoding with a provenance tag $\pi$ in a leak-incriminating encoding embodiment. This protocol allows the server to prove to the client that G represents the application of an hourglass function to F under a correct incorporation of provenance tag $\pi$. We let $\sigma(M)$ denote a digital signature by the server on message M.

In this protocol, the file is divided into n blocks and a signature $\sigma_i$ is embedded with each block $F_i$ so that no block $F_i$ can be retrieved without revealing the signature embedded with $F_i$. This property is achieved by applying the above-noted all-or-nothing transform AoNT to each file block and the corresponding signature. Block $G_i$ of encoded file G is then computed as $AoNT[\sigma_i, F_i]$, where $\sigma_i$ is a signature by the server on the file handler handler and block index i. The file handler in the present embodiment may be assumed to be a unique label for the file.

The provenance tag $\pi$ comprises the file handler and hashes on signatures $\sigma_i$ and is published by the server. A proof of leakage by an external entity may comprise a number v of correct signatures, i.e., v signatures corresponding to hashed signatures in $\pi$. The value v is a security parameter such that $q<v\leq n$.

The challenge procedure is similar to that previously described for the case of encryption encoding. The client challenges q randomly selected segments of the file, and the server replies with the corresponding signatures. The client verifies that the AoNT encoding is performed correctly on the challenged segments and that signature hashes match those published in the provenance tag. Using large sized blocks reduces the additional storage expansion for signatures. At the same time, a large block size reduces the challenge space and incurs overhead in the challenge procedure of Phase 1, as large file blocks have to be retrieved to check signature correctness. Thus, one can adjust these parameters to achieve a balance among different metrics of interest. For example, one possible set of parameters is a block size of $O(\sqrt{|F|})$ bits, resulting in $n=O(\sqrt{|F|})$ blocks.

Again, the protocols of FIGS. 5, 6 and 7 for providing correct encoding are suitable for use in any of a wide variety of contexts, and are not limited to use in the multi-phase and hourglass function context of the FIG. 3 protocols.

As indicated previously, the file protection verification functionality disclosed herein can be implemented at least in part in the form of one or more software programs stored in memory and executed by a processor of a processing device such as client device 102, one or more of the servers 106, or controller 108. A memory having such program code embodied therein is an example of what is more generally referred to herein as a "computer program product."

It should again be emphasized that the above-described embodiments of the invention are presented for purposes of illustration only. Many variations and other alternative embodiments may be used. For example, although described in the context of particular system and device configurations, the techniques are applicable to a wide variety of other types of storage systems and processing devices. The particular process steps used to verify protections for a given file may be varied in alternative embodiments. Also, the types of encodings, proofs, challenges, responses and other protocol details used in a given alternative embodiment may be varied relative to the arrangements of the illustrative embodiments. In addition, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
providing a file to a file system for encoding;
receiving from the file system a proof of correct encoding of the file; and
verifying the proof of correct encoding;
wherein the providing, receiving and verifying steps are performed by a processing device comprising a processor coupled to a memory; and
wherein verifying the proof of correct encoding further comprises verifying receipt of the proof of correct encoding from the file system within a designated period of time from sending a request to the file system for the proof of correct encoding.

2. The method of claim 1 wherein the encoding comprises encryption encoding and the proof of correct encoding comprises a permutation key utilized in a keyed pseudo-random permutation that is applied to the file.

3. The method of claim 2 wherein the proof of correct encoding further comprises an encoded file generated by encryption under at least first and second encryption keys, with the first encryption key being based on information supplied by a provider of the file and the second encryption key being based on secret information associated with the file system.

4. The method of claim 1 wherein the encoding comprises leak-incriminating encoding and the proof of correct encoding is generated utilizing hashes on digital signatures associated with respective blocks of the file.

5. The method of claim 4 wherein the proof of correct encoding comprises an encoded file generated by applying an all-or-nothing transform function to the respective blocks of the file and their associated digital signatures.

6. The method of claim 1 wherein the proof of correct encoding comprises at least a portion of an encapsulation of an encoded file generated by the file system and wherein the verifying step comprises generating the encapsulation of the encoded file.

7. The method of claim 6 wherein the encapsulation of the encoded file is generated by application of an hourglass function to the encoded file, the hourglass function providing a block-by-block transformation of the encoded file.

8. The method of claim 7 wherein the hourglass function enforces a minimum resource requirement on translation from the encoded file to particular blocks of the encapsulation.

9. The method of claim 7 wherein each block of the encapsulation depends on multiple spread-out blocks of the encoded file.

10. The method of claim 6 wherein the verifying step further comprises:
generating a plurality of integrity checks based on respective blocks of the encapsulation; and
sending the integrity checks to the file system.

11. The method of claim 6 wherein the verifying step further comprises:
generating a plurality of challenges based on respective randomly-selected blocks of the encapsulation;
sending the challenges to the file system; and
processing responses to the challenges from the file system to verify that the file system stores at least the portion of the encapsulation of the encoded file.

12. The method of claim 11 wherein the verifying step further comprises determining that the file system stores at least the portion of the encapsulation of the encoded file if and only if valid replies to the challenges are received from the file system within the designated period of time from the sending of the challenges.

13. A computer program product comprising a non-transitory processor-readable storage medium having encoded therein executable code of one or more software programs, wherein the one or more software programs when executed cause a processing device to perform the steps of:
providing a file to a file system for encoding;
receiving from the file system a proof of correct encoding of the file; and
verifying the proof of correct encoding;
wherein verifying the proof of correct encoding further comprises verifying receipt of the proof of correct encoding from the file system within a designated period of time from sending a request to the file system for the proof of correct encoding.

14. An apparatus comprising:
a processing device comprising a processor coupled to a memory;
wherein the processing device further comprises a file processing module, the file processing module being operative to provide a file to a file system for encoding, to receive from the file system a proof of correct encoding of the file, and to verify the proof of correct encoding; and
wherein the file processing module is operative to verify the proof of correct encoding by verifying receipt of the proof of correct encoding from the file system within a designated period of time from sending a request to the file system for the proof of correct encoding.

15. The apparatus of claim 14 wherein the encoding comprises encryption encoding and the proof of correct encoding comprises a permutation key utilized in a keyed pseudo-random permutation that is applied to the file.

16. The apparatus of claim 15 wherein the proof of correct encoding further comprises an encoded file generated by encryption under at least first and second encryption keys, with the first encryption key being based on information supplied by a provider of the file and the second encryption key being based on secret information associated with the file system.

17. The apparatus of claim 14 wherein the encoding comprises leak-incriminating encoding and the proof of correct encoding is generated utilizing hashes on digital signatures associated with respective blocks of the file.

18. The apparatus of claim 17 wherein the proof of correct encoding comprises an encoded file generated by applying an all-or-nothing transform function to the respective blocks of the file and their associated digital signatures.

19. The apparatus of claim 14 wherein the proof of correct encoding comprises at least a portion of an encapsulation of an encoded file generated by the file system and wherein the file processing module is operative to generate the encapsulation of the encoded file by applying an hourglass function to the encoded file, the hourglass function providing a block-by-block transformation of the encoded file and enforcing a minimum resource requirement on translation from the encoded file to particular blocks of the encapsulation.

20. The apparatus of claim 19 wherein the file processing module is operative to:
  generate a plurality of challenges based on respective randomly-selected blocks of the encapsulation;
  send the plurality of challenges to the file system;
  process responses to the plurality of challenges from the file system to verify that the file system stores at least the portion of the encapsulation of the encoded file; and
  determine that the file system stores at least the portion of the encapsulation of the encoded file if and only if valid responses to the plurality of challenges are received from the file system within the designated period of time from the sending of the plurality of challenges.

* * * * *

UNITED STATES PATENT AND TRADEMARK OFFICE
CERTIFICATE OF CORRECTION

PATENT NO. : 9,230,114 B1
APPLICATION NO. : 14/308949
DATED : January 5, 2016
INVENTOR(S) : Ari Juels et al.

Page 1 of 1

It is certified that error appears in the above-identified patent and that said Letters Patent is hereby corrected as shown below:

In the specification:

Column 7, line 64, please change " $\{\kappa_l\}_{i=}^{n}$ " to -- $\{\kappa_i\}_{i=1}^{n}$ --

Column 12, line 17, please change " $E_{\kappa_i,\kappa}*$ " to -- $E_{\kappa_i,\kappa^*}$ --

Signed and Sealed this
Nineteenth Day of April, 2016

Michelle K. Lee
*Director of the United States Patent and Trademark Office*